March 22, 1949.  J. H. CHANDLER  2,464,921
STRAINER
Filed May 29, 1944
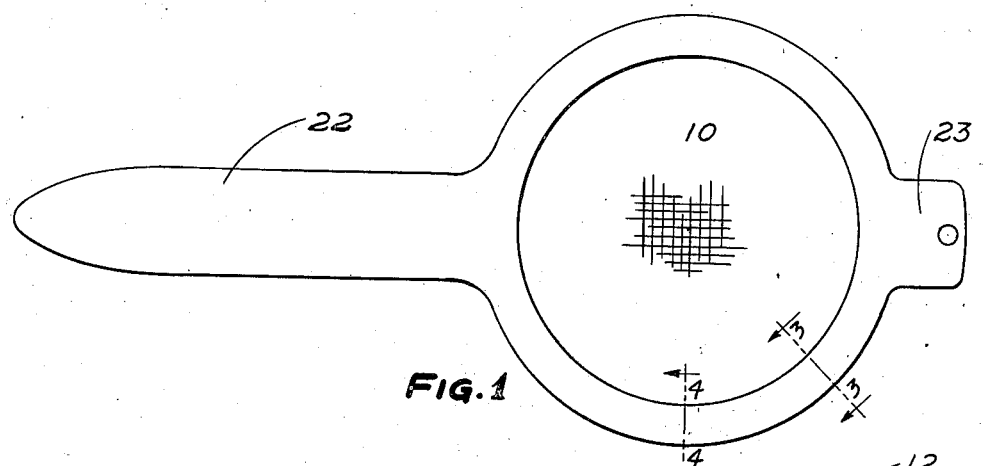
FIG.1
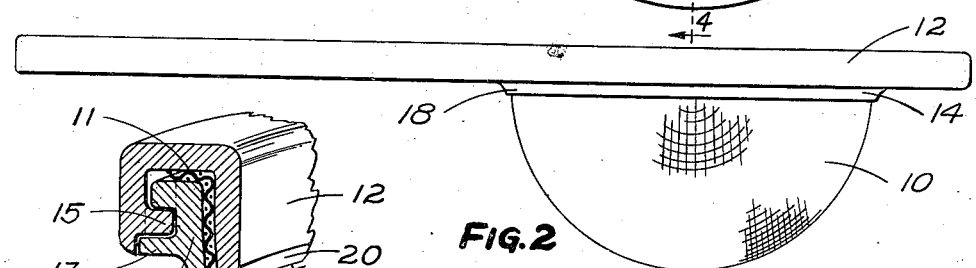
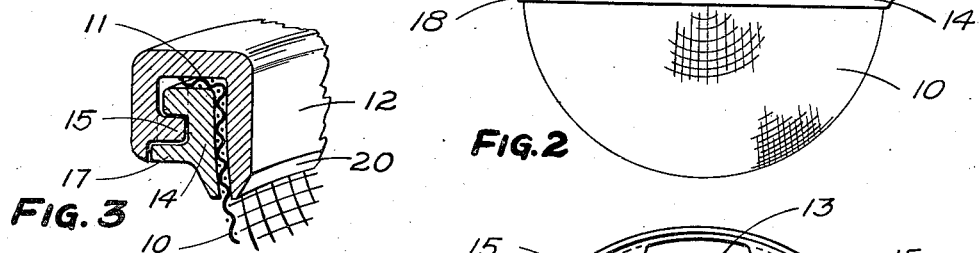
FIG.2
FIG.3
FIG.4
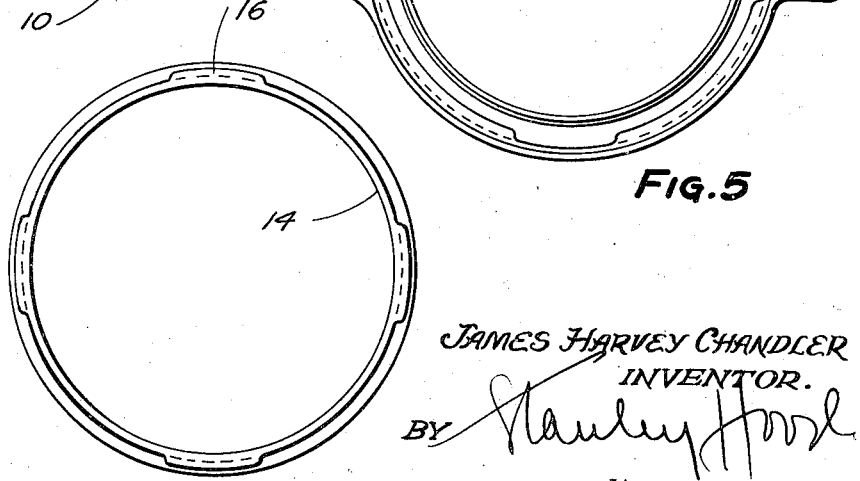
FIG.5
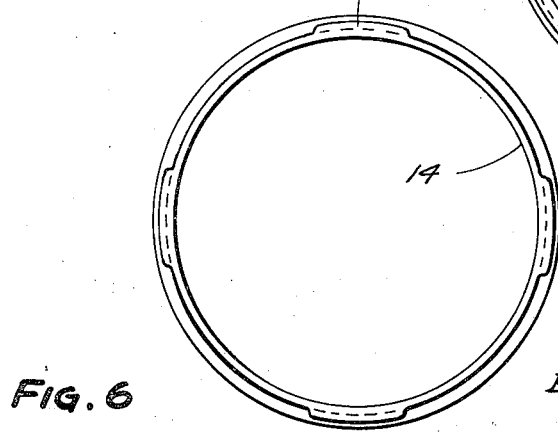
FIG.6
JAMES HARVEY CHANDLER
INVENTOR.
BY
ATTORNEY Patented Mar. 22, 1949

2,464,921

UNITED STATES PATENT OFFICE 2,464,921

STRAINER

James Harvey Chandler, Oak Park, Ill., assignor to Ekco Products Company, a corporation of Illinois Application May 29, 1944, Serial No. 537,790

5 Claims. (Cl. 210—161)

This invention relates to new and useful improvements in a strainer of the type wherein the bowl shaped filtering element of wire screening or fabric is secured at its peripheral edge to a rigid reinforcing frame or rim.

An object of this invention is to provide a strainer of this type wherein the bowl is detachably secured to a reinforcing rim, whereby the strainer may be dismantled to facilitate cleaning as well as to enable the user to substitute filter elements of a different character.

Another object of this invention is to provide a reinforcing frame or rim consisting of a pair of separate sections detachably connected to clamp the periphery of a strainer bowl or filter element therebetween so that the frame sections and bowl are united to provide an article having the rigidity of a unitary body, the parts of which will remain assembled, unless for some reason or other it may be desired to separate them.

Another object of this invention is to provide a rim or frame of this character wherein one of said sections is so confined within a cavity opening downwardly from the other section as to locate lower surface portions of said sections at opposite sides of their junction in substantially coplanar relation and at the same time concealing the parts of the rim sections which cooperate to detachably connect said sections.

It is also an object of this invention to provide a rim composed of sections wherein the free edge portion of the rim sections in engagement with downwardly extending marginal portion of the strainer bowl extends uniformly below the lower limits of the rim sections in the form of lips of downwardly reduced thickness whereby the exposed junction between the screen bowl and the reinforcing rim is free from abrupt edges and accordingly susceptible to easy cleaning.

It is also an object to provide an article of this class which is very simple and economical of construction proportionate to its functions, durable, highly efficient and which will not readily deteriorate or get out of order.

With the above and other objects in view as will be apparent, this invention consists in the construction, combination and arrangement of parts, all as hereinafter more fully described, claimed and illustrated in the accompanying drawing:

Fig. 1 is a top plan view of a strainer constructed in accordance with this invention;

Fig. 2 is a side elevation thereof;

Fig. 3 is an enlarged fragmentary vertical section taken on line 3—3 of Fig. 1;

Fig. 4 is a similar view taken on line 4—4 of Fig. 1;

Fig. 5 is a bottom plan view of the outer or upwardly exposed section of the rim having an annular cavity;

Fig. 6 is a top plan view of the section of the rim designed to cooperate with the cavity in the rim section shown in Fig. 5.

Reference being had more particularly to the drawing, 10 represents the wire screen or bowl of the strainer which member partakes of any suitable shape or size in the finished product and 11 indicates a flange at the periphery of the bowl 10.

The improved reinforcing rim or frame in conjunction with which the bowl 10 is preferably applied as shown in the drawing, consists of an annular member or section 12, which is provided with an annular cavity 13 on its underside, designed to loosely receive the flange 11, of the wire bowl 10. The flange 11 of the bowl when thus placed within the recess 13 is tightly locked in place by means of a second annular member 14, which is designed to enter and be confined within the cavity 13 and bear against the side of the strainer flange 11 opposite to the side thereof which bears against the walls of the cavity 13. The sections 12 and 14 may be permanently secured, if so desired, by cementing or other suitable means. However, as shown in the drawings, the sections 12 and 14 are preferably detachably connected by suitable fastening means such as circumferentially spaced lugs 15 and 16. The spaces between the lugs 15 and 16 accordingly provide entrance recesses whereby the lugs 16 in the rim section 14 are movable past the entrance recesses between lugs 15 on the rim section 12 and the lugs 15 on rim section 12 are movable past the entrance recesses between the lugs 16 on the rim section 14, when said rim sections 12 and 14 are in predetermined relatively rotated position. Upon relative rotation of said sections 12 and 14 in either direction laterally of said position, the lugs 16 on rim section 14 will be engaged by the lugs 15 on rim section 12 so as to obstruct separation of the rim sections. As shown in Figs. 3 and 4, the spaces between the lugs 15 and 16, when in engaged position, are concealed by an outwardly laterally extending lip 17 formed on the rim section 14 in spaced underlying relation to the lugs 16 and of such dimension as to cooperate with the lower edge of the outer wall of rim section 12 to substantially conceal said recesses and lugs in the rim sections 12 and 14 when the latter are operatively assembled. It will be noted that the lower surface of the lip 17 and lower edge of the outer wall of rim section 12 form substantially coplanar surfaces on opposite sides of their juncture indicated in the drawings by reference numeral 19.

The members 12 and 14 are preferably, though not necessarily of molded plastic material.

An elongated handle 22, formed of the same material as the section 12, and preferably formed integrally therewith, provides a construction that adds to the sanitary features of the article contemplated by this invention.

The extension of the sections 12 and 14 so as to form downwardly and inwardly converging annular lips 18 and 20, provides means for engaging a marginal portion of the wire bowl 10 a slight distance below the lower limits of the outer sections 12 and the surface of the inner section 14, at the joint 19 therebetween. This arrangement places the exposed joint within the bowl 10 and the members 12 and 14 in a position more readily accessible for cleaning purposes.

In accordance with the construction and arrangement of the members 12 and 14 in relation to the strainer bowl 10 as described above, when it is desired to separate the parts for cleaning or to substitute a new or different bowl 10 it is only necessary to rotate the member 14 to such an angular position as to free its lugs 16 from the lugs 15 of the member 12. Likewise, when it is desired to connect the members 12 and 14 after the bowl 10 of desired character is confined within the recess 13 of the member 12, it is only necessary to rotate the member 14 into a position where its lugs 16 are locked behind the lugs 15 of the member 12.

From the foregoing description it will be apparent that a strainer having a wire mesh type bowl has been devised for use in conjunction with the reinforcing element consisting of complementary sections adapted to be detachably connected to form an article having the rigidity of a unitary article conjointly with the strainer bowl and at the same time having the seam or joint between the sections of the frame so disposed as to avoid exposure thereof from the upper side of the article as well as to eliminate abrupt joints or shoulders which might otherwise invite unsanitary conditions.

What is claimed is:

1. A strainer comprising a wire screen bowl having a flange projecting laterally outwardly from its upper periphery, a separately formed annular rim section having an annular cavity defining internal wall portions with which the upper surface of said bowl flange and the internal surface of the upper portion of the bowl surrounded by said flange are engageable, a second separately formed annular rim section adapted to enter said cavity in the first rim section for engagement with the lower surface of said bowl flange and the external surface of the upper portion of the bowl surrounded by said flange, and adapted to be rotated relative to said first named rim section about an axis to which said sections are concentric when said second rim section is operatively positioned within said cavity, and means for retaining said rim sections against separation along said axis including a plurality of circumferentially spaced lugs on said second rim section extending laterally outwardly from the second rim section and a plurality of similar lugs on said first section extending laterally inwardly from the internal wall portion of said cavity, said last mentioned lugs being adapted to engage beneath the lugs on the second rim section upon rotation of the rim sections relative to each other thereby to lock the two together.

2. A strainer as claimed in claim 1 wherein the free edge portion of the second rim section adjacent the upper portion of the strainer surrounded by said flange and the edge portion of the first rim section opposite said free edge portion of said second rim section are of reduced thickness towards said free edge portions to bring the same substantially coincident with the internal and external surfaces of the strainer bowl extending therebelow.

3. A strainer as claimed in claim 1 wherein a lip formed on the second rim section and spaced below said lugs cooperates with the lower edge of the outer wall of the first rim section to substantially conceal said lugs and the spaces therebetween when the rim sections are operatively assembled.

4. A strainer as claimed in claim 1 wherein the free edge portions of the rim sections in engagement with the internal and external surfaces of the strainer bowl below said flange are located substantially below the lower surface portions of the rim sections which surround said free edge portions.

5. A strainer as claimed in claim 1 wherein the lower edge of the outer wall of the first rim section and the lower surface portion of the second rim section are substantially coplanar at opposite sides of their junction.

JAMES HARVEY CHANDLER.

REFERENCES CITED

The following references are of record in the file of this patent:

UNITED STATES PATENTS

| Number | Name | Date |
|---|---|---|
| 362,429 | Crowell | May 3, 1887 |
| 1,231,356 | Houge | June 26, 1917 |
| 1,406,581 | Pick | Feb. 14, 1922 |
| 1,408,666 | Watson | Mar. 7, 1922 |
| 1,710,758 | Wright | Apr. 30, 1929 |
| 1,906,603 | Hungerford | May 2, 1933 |
| 2,174,577 | Friedman | Oct. 3, 1939 |
| 2,241,229 | Williams | May 6, 1941 |
| 2,302,991 | Franzmeier | Nov. 24, 1942 |
| 2,391,215 | Zabel et al. | Dec. 18, 1945 |